US008423509B2

(12) United States Patent
Humprecht

(10) Patent No.: US 8,423,509 B2
(45) Date of Patent: Apr. 16, 2013

(54) SYSTEM AND METHOD FOR DIRECT SWITCHING OF DATA CONTENT

(75) Inventor: Hans-Christian Humprecht, Heidelberg-Ziegelhausen (DE)

(73) Assignee: SAP AG, Walldorf (DE)

( * ) Notice: Subject to any disclaimer, the term of this patent is extended or adjusted under 35 U.S.C. 154(b) by 400 days.

(21) Appl. No.: 12/783,019

(22) Filed: May 19, 2010

(65) Prior Publication Data
US 2011/0289307 A1 Nov. 24, 2011

(51) Int. Cl.
G06F 17/30 (2006.01)
G06F 1/24 (2006.01)

(52) U.S. Cl.
USPC .......................... 707/634; 707/636; 713/100

(58) Field of Classification Search .................. 707/771, 707/758, 741, 634, 636; 713/100; 709/223–224; 711/162; 717/120, 121
See application file for complete search history.

(56) References Cited

U.S. PATENT DOCUMENTS

| | | | | |
|---|---|---|---|---|
| 7,328,260 B1 * | 2/2008 | Muthiyan et al. | ............. | 709/224 |
| 7,529,900 B2 * | 5/2009 | Hiraiwa et al. | ............... | 711/162 |
| 7,774,444 B1 * | 8/2010 | George et al. | ................. | 709/223 |
| 2005/0120106 A1 * | 6/2005 | Albertao | ....................... | 709/223 |
| 2007/0266211 A1 * | 11/2007 | Hiraiwa et al. | ............... | 711/162 |

* cited by examiner

Primary Examiner — Hung T Vy
(74) Attorney, Agent, or Firm — Kenyon & Kenyon LLP

(57) ABSTRACT

The invention may provide "undo" (e.g., rollback) features, along with data management simplification features, to an update package model of software suite development/evolution. New functions, which may have disruption effects for customers, may be installed into the core configuration data with inactive switches. Upon activation, a switch status may change, and a query filter may use the activated function (e.g., as associated with the switch ID). Original functions may be maintained, giving the user the ability to deactivate an activated function, and thereby reverting the system back to the prior configuration status.

15 Claims, 3 Drawing Sheets

SYSTEM AND METHOD FOR DIRECT SWITCHING OF DATA CONTENT

BACKGROUND

Business entities require business software for performing an array of essential tasks. Communication, planning, inventory control, order processing, systems monitoring, and nearly every facet of a business' operations. A business entity often requires a software solution with features, interfaces, data management, and other aspects unique to that one specific company. Yet, core functions may be similar among the different unique solutions. These core functions may be provided to several, unique business entities, e.g., companies. In addition to needing to vary several initial deployments among a variety of customer-companies, these varied implementations may need constant updating, to evolve with the evolving business' needs.

Software developers may design and provide a set of software tools in a generic or universal form. These tools may be controlled by a set of customization data that is specific to each unique customer. Unlike the companies transactional data, which may include millions of data records or more, the configuration and customization data may represent a very small and rarely changing set of data. This data may modify, instantiate, activate, or otherwise implement the provided tools, in a customer specific manner. With the configuration data, customers may be able to modify every aspect of their software experience, including defining the user interfaces, what functions are available on the interfaces, and/or what fields are provided to the user.

The configuration data module of business software suits may also facilitate a software enhancement package strategy to simplify the way customers manage and deploy new software functionality. Customers may selectively implement enhancement software functions (e.g., as included in the enhancement package) and activate the software upon business demand. As a result, customers may be able to isolate the impact of software updates from introducing/rolling out new functionality and bring new functionality online faster through shortened testing cycles.

The enhancement package model may deliver innovations through the enhancement packages approximately every 9 to 12 months. Customers would no longer have to plan for major releases every five years. They could choose to selectively implement the business functions or technical improvements that add the value that matters most to their business. Software developers may use enhancement packages to quickly and easily deliver business and industry-specific functionality, enterprise services, and other functions that help improve and simplify the use of existing software packages, through user interface and other end-to-end process improvements.

A software enhancement package may include a set of enhanced functionality that may be integrated into an existing software suite. Each enhancement package may contain new versions of existing software components and/or completely new functions. Each change to the functions in a system has the potential for customer disruption. In order to minimize disruption and increase customer acceptance, a switch framework may also be provided, including a switch status table. Using this framework, enhanced functions (e.g., those in the enhancement packages) may be delivered in an inactive form. Then, within the enhancement packages, customers may choose which software components should be updated in their systems depending on the new/extended functionality they want to use.

In enhancement package contexts, it may be the case that new functionality must be explicitly switched on to become active/visible in the system. A core unit of functionality within the system, and as described herein, may be referred to as a business function. The business function may also be the core unit within an enhancement package that can be activated/switched on. Activating a business function may trigger the associated switches, which may then influence the execution of the code enhancements. These switches may ensure that customers only see and make use of the new functionality if they have activated them. The activation process may also start a job (e.g., a batch-job or cron-job, etc.) in the particular example system that automatically performs all changes in that system.

Embodiments of the present invention concern further improvements in the enhancement package model. Currently, by virtue of the switch framework, delivery of enhancement packages do not cause disruption, and customers may select only those functions they want, limiting disruption to those specific enhancements. However, the enhancements often overwrite configuration data, adding functions, changing functions, deleting/replacing functions, etc. The disruption to the system caused by these activations cannot easily be assessed before installation, and there is no way currently to reverse the installation in a cost/time effective manner. Thus, example embodiments of the present invention relate to additional procedures, functions, and systems for facilitating a reversal of enhancement activations.

DETAILED DESCRIPTION

Figure 1:
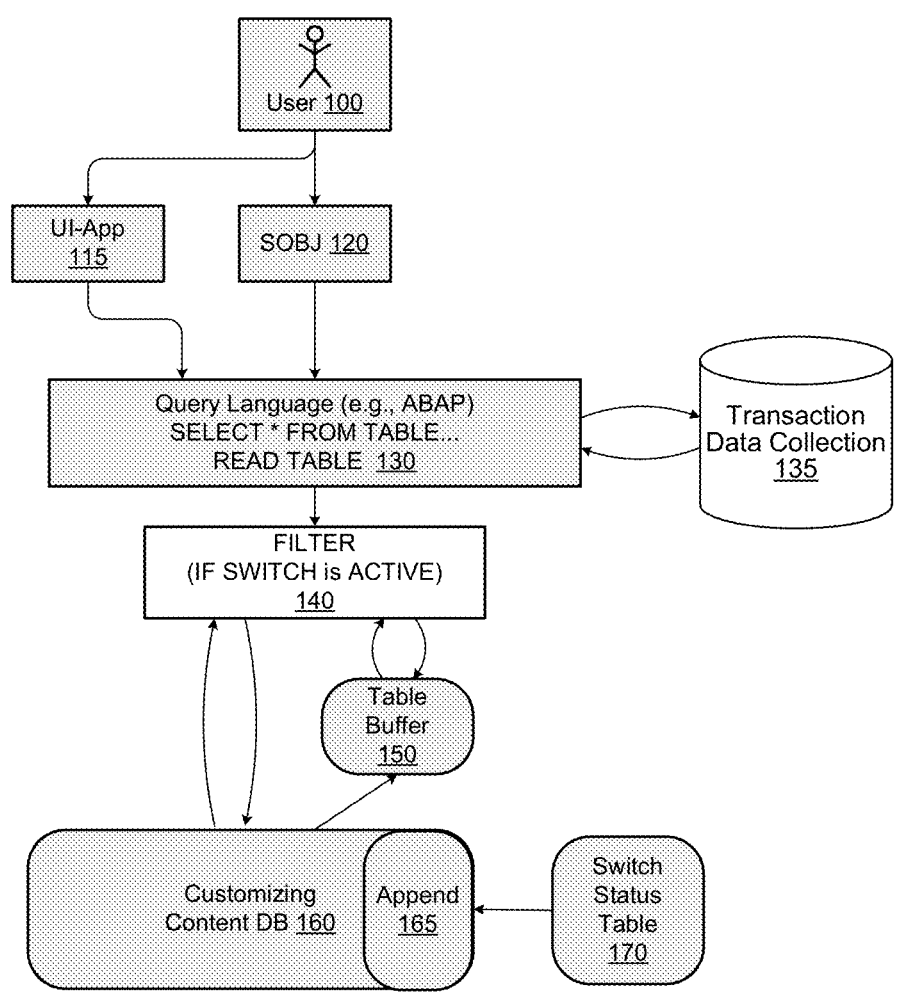
FIG. 1 the relationship between different components of an example process, according to one example embodiment of the present invention.

In a software suite that evolves with customer demand, an enhancement or update package strategy may be used. An update package may contain function coding that adds configuration data. Configuration data may be part of the technical system settings, e.g., key data that may be necessary for customization of user interfaces and business processes. Customizing may include a process to transform standard software to individual business processes. In a working system, an average 5% of data records may be configuration data, while the bulk of the data records may be transactional data. Example embodiments of the present invention describe a technique to handle configuration data in the enhancement package environment. It may be important in minimizing customer disruption, that the actual importing of configuration data via a system upgrade does not affect the customization processes. To ensure this behavior, new configuration data may be delivered in separate enhancement packs that may include separate configuration data sets. This additional data may put the producing effort in the configuration life cycle management on the customer side. However, the customer may not have mechanisms to detect data overlapping between his own configuration data and the data stored in the enhancement pack. When one or more enhancement packs are activated, they may harm, e.g., overwrite, the existing configuration data. Example embodiments of the present invention may avoid data conflicts between the original configuration data and the new upgraded configuration data.

FRAMEWORK OF EXAMPLE EMBODIMENTS

The enhancement or update package design is a model for developing and shipping innovations. This model may include Stable Core Releases and innovation via enhancement packages, e.g., between the stable core releases. Instead of providing functional modification and additions via a series of major releases, a single release may be followed by a series of enhancement packages that are optional for the customer. Support packages for the stable core may be shipped in addition to enhancement packages, but may be strictly separated from the enhancement packages. Enhancement packages may be based on a particular stable core release, and may be dependent on that release, such that customers may have to install that stable core in order to activate the associated enhancement package. This model may make innovations accessible to customers more quickly while minimizing the risk of affecting existing functionality used by the customer. The customer may now be able to benefit from new functionality without being forced to apply a release update. In addition, the customers may be able to select only those new functions that are required for their business.

Preferably, interoperability between the applications should not be affected by the activation (e.g., switching on) of business functions. The activation (switching on) of a business function should not affect existing business processes, e.g., processes should not become inconsistent. It may be that the switching on of business functions will change business processes in a way that they will offer more functionality. Switching on of a business function should not depend on the status of business functions in other systems. It may be a goal to offer all cross system process enhancements in this way, e.g., downward compatible. For example, there may be two application systems A and B, and there may be a cross-systems business process in place which affects system A and system B. Further, the example may have additional BF1 and BF2, which may influence this business process. In this case, stable core guarantees may dictate that installation in one system, or at least the dominate system may not require instillation in the other system, or at least the dependent system.

The business functions may serve as the core of business processes, with business functions of enhancement packs allowing customers to enhance business processes. In order to achieve the flexibility benefits this model provides, certain requirement may be imposed. For example, stable core functions may be required to function without issue, and enhancement functions associated with the stable core, may be required to cause no disruption upon installation, but prior to activation. Test cases may be assigned to a business function. For example, test cases for compatibility and for correctness of the business functions may be assigned to each business function. Compatibility tests may ensure that new enhancement package versions of software components work with the stable core version of other software components. Test cases for business functions may ensure both that the deactivated functions do not affect the existing system and that the new functionality works correctly when the switches are activated. A business function should not only work from a business point of view but also from a technology point of view. A business function may have one or more prerequisite dependencies, such as BF1 defines BF2 as prerequisite. BF1 may include one or more switches of BF2 in order to reuse technical elements. There may also be cases where business functions are mutually exclusive. In other words, a first business function may be prohibited from activation if a second business function is already active and vice versa. This could also be mapped in the system through a so called conflict dependency. In customer test environments business functions may be reversible after having evaluated the new functionality and estimated the implementation effort required of the installation or activation. This reversibility may be provided by implementation of one or more example embodiments of the present invention, described herein.

In order to make the business functions of enhancement packs optional, switches may be used. The switches may be assigned to business functions and may only be activated via the business function. A switch may always be imported as inactive in the customer system. If a switch at the customer system is already active and it is again imported via transports, then the active state may be unaffected. Switches may be provided in a switch framework for activating business functions, to analyze activation logs and the history of activations, and start the transport process from a test system to the productive system. Configuration content to introduce new functionality may be part of an enhancement package, and may be assigned to a switch, which is assigned to a business function. Configuration content may be installed as a plurality of table entries in a database table. Each table entry may get an assignment to a switch, and each switch may be a grouping of configuration table entries related to a business function.

EXAMPLE EMBODIMENTS

Example embodiments of the present invention may move the update configuration data from separate enhancement package datasets, to the central configuration dataset. This may provide several benefits. First, transparency may be increased because it may avoid different data storages for configuration data (e.g., the original dataset and each enhancement pack). It may increase robustness and simplify the implementing of new predefined business functionality. It may allow for the deactivation of preconfigured business functionality in the testing phase. It may reduce the complexity by forgoing the separate configuration sets. Finally, it may reduce the total cost of ownership for managing the configuration data life cycle in the enhancement pack environment. Example embodiments for accomplishing one or more of these benefits are described below, but generally include the use of system switches to provide activation switching of enhancement functions at the specific content level, e.g., at the data record level.

Example embodiments of the present invention include systems and methods that may facilitate the direct switching of content, specifically, configuration data of a configuration database. FIG. 1 illustrates one example embodiment of a database system. There may be a user 100 who interacts with the system, e.g., a customized business software suite executed by one or more computer systems. The user may access a user interface application 115. Further, user 100 may have a design environment SOBJ 120. SOBJ may be a tool and technique provided by the developer to support all customizing design time actions. The generic design time framework for maintaining customizing data may be enhanced by example embodiments of the present invention.

As was described above, example systems may include a customizing content database (e.g., 160) that defines certain variables, functions, parameters, and configurations of the software suite, to provide a unique solution for this particular customer (e.g., a company user 100 works for). The overall customizing content database 160 may contain all of the configuration data from the developer, partners, and the end-user customer, including both the productive configuration data and the configuration data not activated (e.g., not yet activated, or deactivated). This may include the enhancement pack data in the configuration database, which may make separate enhancement pack databases superfluous. Via the interface application 115, the user 100 may access one or more databases that define the transactional data of the system, e.g., transaction data collection 135. This data may be the various data records the software suite stores and manipulates as part of its functioning, e.g., stored email, customer records, invoices, projects, task lists, etc.

The example database system of FIG. 1 may include a query language and a query interface 130. Any query language is possible, such as ABAP, mySQL, or any number of other proprietary or public query languages used to create, manipulate, and maintain databases. In addition to transaction data, e.g. 135, the actual functions of the software suite may be stored in a database. Calling a function within the software may include querying that function, along with any custom configurations stored in the customizing content database 160. The system may also include a table buffer 150 to cache and quickly call common functions. The example system may also include a switch status table 170, as part of the switch framework. One tool of the software suite may be a system switch, or an internal data structure used to designate certain data records (e.g., an enhancement function) as active or inactive. Subsequent to the initial deployment, an enhancement package may have been delivered and installed, but not activated. Once the customer, e.g., user 100, activates one or more enhancement functions, those functions may be installed in the customizing content database 160, along side the old functions, even those functions the enhancements are meant to overwrite or modify. Additionally, records in the customizing database 160 may have an added attribute of a switch ID. Alternatively, only the enhancement functions may have this added attribute. Append 165 may include the new switch ID record field and contain a unique switch ID generated by the switching framework. The status of those various switches (e.g., as labeled by the various switch IDs) may be maintained in the switch status table 170.

Figure 2:
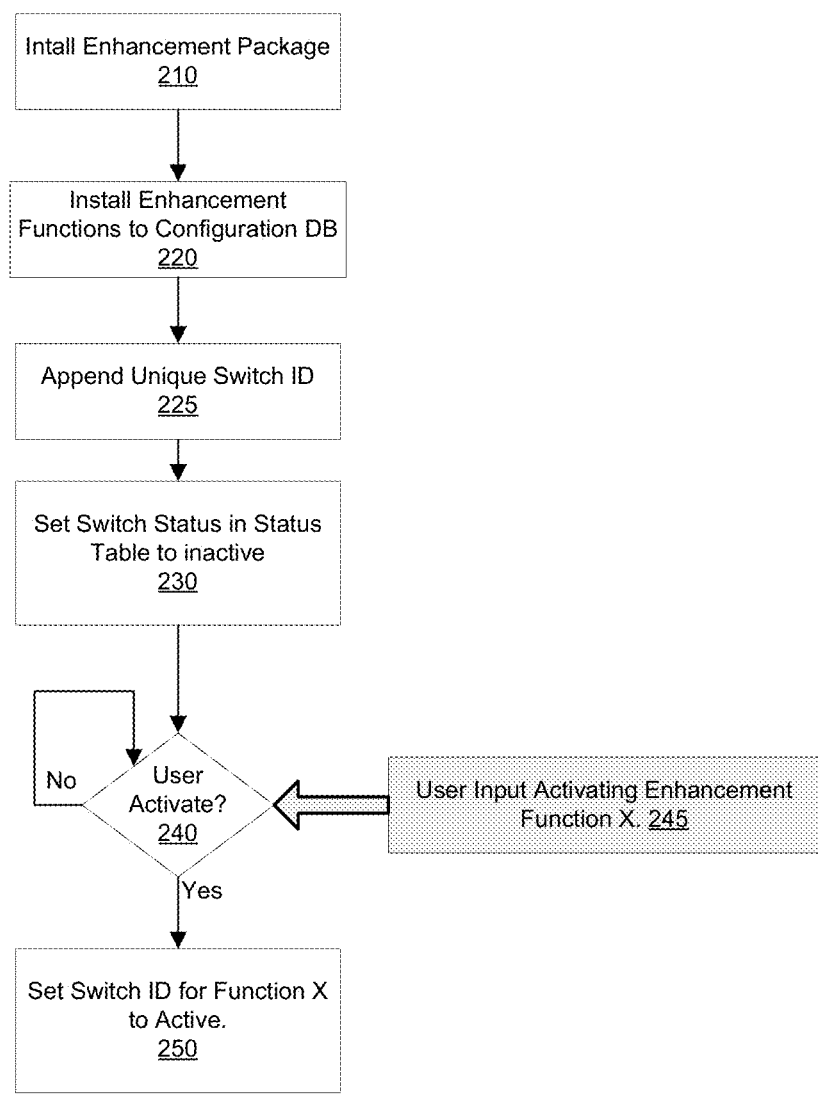
FIG. 2 illustrates an example process for data switching, according to one example embodiment of the present invention.

FIG. 2 illustrates one example procedure, according to one example embodiment of the present invention. For example, at 210, the software suite may receive an enhancement package, including one or more enhancement functions. At 220, the enhancement functions may be installed in the configuration DB, e.g., 160. The example procedure may then append a switch field to each of the enhancement functions and provide them with a unique switch ID, e.g., at 225. The unique switch ID may also be registered in the switch status table and set to inactive, e.g. at 230. Then, at 240, the example procedure may wait for one of these enhancement functions to be activated by the user. During this period, the system may operate normally, as if there were no enhancement functions installed, and wait for user input indicating a desire to activate one or more of the functions. When the example procedure receives user input (e.g., 245) indicating that one or more functions should be activated, the example procedure may then (e.g., at 250) set the switch ID entry in the switch status table for function X to "active."

When a switch status is active, the query language module (e.g., 130) and the switch filter (e.g., 140) may forward function calls to the enhancement function. In one example embodiment, a delivered or an old customizing table record (e.g., an original function, core function, or function other than an enhancement function) may have no assignment to a switch ID. In that case the entry is active by default. Examples of the switch framework may include a tool that provides the technical prerequisites to control which functions are made visible, e.g., via system switches, the status table, and/or query filter. The switch framework may be added to the system as part of the example embodiments, or may already exist, being used to switch other features within the software suite. The switch framework may be used to activate, for example, enhancement objects, interface elements, or customizing layers.

The filter function may then return results based on the switch status table. For example, table 1 below may have keys 1 to 4 and may have values A to D. There may also be a first switch SW1 and a second switch SW2 (for example, SW1 may be associated with key 2, and SW2 may be associated with key 3). A business function of an enhancement pack may be associated with SW1, and once a user activates that business function, the switch status table may include SW1=active, SW2=inactive. The filter may then modify results based on the switch status. For example an SQL SELECT command may return the associated values for keys 1 and 4, since those keys have not been associated with a switch. Further, for keys 2 and 3 the filter will automatically return results based on switch status. Thus, a read command (e.g., SELECT) for key 2 may also return a result after confirming that SW1 has an active status. A select command for key 3 may return an error, or a "no data" result, since the associated key is inactive.

TABLE 1

| Key | Value | Switch |
|---|---|---|
| 1 | A | |
| 2 | B | SW1 |
| 3 | C | SW2 |
| 4 | D | |

TABLE 2

| Switch ID | Status |
|---|---|
| SW1 | Active |
| SW2 | Not Active |

In some cases new table content in a new enhancement pack may overwrite an existing table entry. The example configuration data tables may not be like the transactional data tables. Transactional data tables may experience high turnover, e.g., frequent modification. The configuration data tables include records that may define interfaces and provide functions, enhancement packs may add to these tables, but it may be rare that they modify existing entries with new values. When such modification or overwriting is required, also referred to as redefinition, it may require a separate database, so as to remain reversible. Referring to the example tables above, a new business function BF3 may be added, and may be associated with switch ID SW3. This business function and associated switch may include a new table key 2, e.g., "b." In this case of redefinition of a table entry, the successor table entry may be delivered in a specific database table. This database table may contain all redefinitions, e.g., tables, keys, and attributes. After activation of BF3 the redefinition may take place and overwrite in table 1, for key 2, the new value 'b'. To reverse this operation, a user may deactivate SW3 and ensure SW1 is active. This ability may be confined to a testing environment, since any transactional data created by the overwrite (e.g., "b" of SW3) may be rendered inaccurate by the reversal back to a function "B" of SW1.

Figure 3:
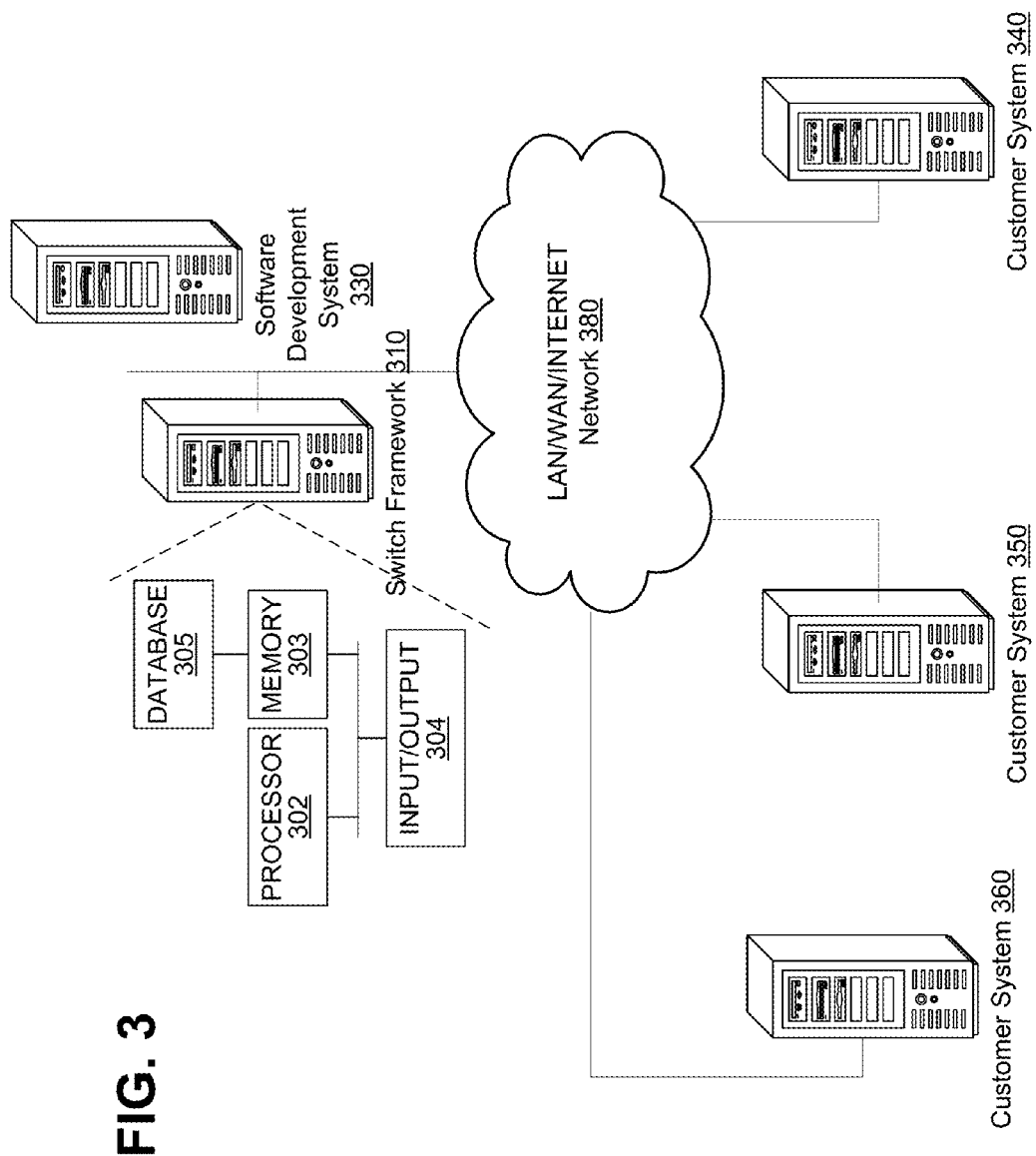
FIG. 3 illustrates an example system, according to one example embodiment of the present invention.

FIG. 3 illustrates one example system, according to an example embodiment of the present invention. The example may include one or more server computer systems, e.g., switch framework 310. This may be one server, a set of local servers, or a set of geographically diverse servers. Each server may include an electronic computer processor 302, one or more sets of memory 303, including database repositories 305, and various input and output devices 304. These too may be local or distributed to several computers and/or locations. Any suitable technology may be used to implement embodiments of the present invention, such as general purpose computers. There may be a software development system 330, which may be on a different server, or run on the same server as the function consolidation engine. These system servers may be connected to one of more customer system 340 to 360 via a network 380, e.g., the Internet. One or more system servers may operate hardware and/or software modules to facilitate the inventive processes and procedures of the present application, and constitute one or more example embodiments of the present invention. Further, one or more servers may include a computer readable medium, e.g., memory 303, with instructions to cause a processor, e.g., processor 302, to execute a set of steps according to one or more example embodiments of the present invention.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A system for managing configuration data enhancements, comprising:
   an electronic computer processor in communication with an electronic database configured to:
      maintain a database of software update configuration data entities;
      install enhancement entities as configuration data entities in the database from a software update package;
      assign a switch to each configuration data entity, including assigning a unique switch identity to each configuration data entity;
      maintain a switch status table; and
      assign each switch to a switch status entry of the switch status table; and a query filter configured to:
      receive a request for a first configuration data entry;
      check a first switch status, in the switch status table, for a switch assigned to the first configuration data entry;
      if the first switch status is an active state, return the first configuration data entry;
      if the first switch status is an inactive state, return one of: a no data result and an error.

2. The system of claim 1, wherein to append a switch includes storing the unique switch identifier (ID) in each configuration data entity of the database of configuration data entities, and to assign each appended switch includes storing the unique switch ID in the switch status table as the switch status entry.

3. The system of claim 2, wherein the append and the assign are each conditioned on specific user activation input.

4. The system of claim 1, further comprising: a table buffer for storing results from the query filter.

5. The system of claim 1, wherein a plurality of configuration data entries share a single switch.

6. The system of claim 1, further comprising:
   a user management interface configured to provide at least the following functions:
      assigning a switch ID to one or more configuration records;
      activate a switch status; and
      deactivate the switch status.

7. The system of claim 1, wherein configuration data is one of:
   data that adds functionality to a generic software suite, data that modifies functionality of the generic software suite, and data that customizes functionality of the generic software suite.

8. A computer-implemented method for managing configuration data enhancements, comprising:
   maintaining, with an electronic processor in an electronic database, software update configuration data entities;
   installing, with the electronic processor, enhancement entities as configuration data entities in the database from a software update package;
   assigning, with the electronic processor, a switch to each configuration data entity, including assigning a unique switch identity to each data entity;
   maintaining, with the electronic processor, a switch status table; and
   assigning each switch to a switch status entry of the switch status table; and
   filtering, with the electronic processor, query requests, including:
      receiving a request for a first configuration data entry;
      checking, with the electronic processor, a first switch status, in the switch status table, for a switch assigned to the first configuration data entry;
      if the first switch status is an active state, returning the first configuration data entry;
      if the first switch status is an inactive state, return one of: a no data result and an error.

9. The computer-implemented method of claim 8, wherein to append a switch includes:
   storing the unique switch identifier (ID) in each configuration data entity of the database of configuration data entities, and assigning each switch includes: storing the unique switch ID in the switch status table as the switch status entry.

10. The computer-implemented method of claim 9, wherein the appending and the assigning are each conditioned on specific user activation input.

11. The computer-implemented method of claim 8, further comprising:
   storing results from the filtering in a table buffer.

12. The computer-implemented method of claim 8, wherein a plurality of configuration data entries share a single switch.

13. The computer-implemented method of claim 8, further comprising:
   providing a user management interface with the electronic process, including at least the following functions:
      assigning a switch ID to one or more configuration records;
      activating a switch status; and
      deactivating the switch status.

14. The computer-implemented method of claim 8, wherein configuration data is one of:

data that adds functionality to a generic software suite, data that modifies functionality of the generic software suite, and data that customizes functionality of the generic software suite.

15. A computer-readable storage medium encoded with instructions configured to be executed by a processor, the instructions which, when executed by the processor, cause the performance of a method, comprising:
- maintaining, with an electronic processor in an electronic database, software update configuration data entities;
- installing, with the electronic processor, enhancement entities as configuration data entities in the database from a software update package;
- assigning, with the electronic processor, a switch to each configuration data entity, including assigning a unique switch identity to each data entity;
- maintaining, with the electronic processor, a switch status table; and
- assigning each switch to a switch status entry of the switch status table; and
- filtering, with the electronic processor, query requests, including:
  - receiving a request for a first configuration data entry;
  - checking, with the electronic processor, a first switch status, in the switch status table, for a switch assigned to the first configuration data entry;
  - if the first switch status is an active state, returning the first configuration data entry;
  - if the first switch status is an inactive state, return one of: a no data result and an error.

\* \* \* \* \*